(12) United States Patent
Studer et al.

(10) Patent No.: US 7,882,683 B2
(45) Date of Patent: Feb. 8, 2011

(54) SYSTEMS AND METHODS OF PROCESSING AND TRANSPORTING WASTE

(75) Inventors: Ritchie G. Studer, Plano, TX (US); Rick R. Redle, Richardson, TX (US); Irfan A. Toor, Plano, TX (US); F. Scott Crawford, Irving, TX (US); Thomas J. Fitzgerald, Lake Forest, IL (US)

(73) Assignee: TDM America, LLC, Addison, TX (US)

( * ) Notice: Subject to any disclaimer, the term of this patent is extended or adjusted under 35 U.S.C. 154(b) by 249 days.

(21) Appl. No.: 11/914,555

(22) PCT Filed: May 16, 2006

(86) PCT No.: PCT/US2006/019117
§ 371 (c)(1),
(2), (4) Date: Nov. 15, 2007

(87) PCT Pub. No.: WO2006/125017
PCT Pub. Date: Nov. 23, 2006

(65) Prior Publication Data
US 2009/0293426 A1  Dec. 3, 2009

Related U.S. Application Data

(60) Provisional application No. 60/681,896, filed on May 16, 2005, provisional application No. 60/689,411, filed on Jun. 10, 2005.

(51) Int. Cl.
*B65B 13/02* (2006.01)

(52) U.S. Cl. .............................. 53/399; 53/118; 53/430; 414/400

(58) Field of Classification Search ................... 53/399, 53/430, 441, 465, 587, 556, 211, 118; 414/555, 414/111, 218, 400, 728, 398
See application file for complete search history.

(56) References Cited

U.S. PATENT DOCUMENTS 3,013,675 A * 12/1961 Schonrock .................. 414/293

(Continued)

FOREIGN PATENT DOCUMENTS

EP    0241231 A2    10/1987

(Continued)

*Primary Examiner*—Sameh H. Tawfik
(74) *Attorney, Agent, or Firm*—Heimbecher & Assoc., LLC

(57) ABSTRACT

Waste-processing and transportation systems and methods are described. An exemplary waste processing and transportation system (10) comprises a receiving area (20) where loose waste (28) is delivered, a baler (22) for processing the loose waste (28) into waste bales (34), and a loading area (26) where the waste bales (34) are loaded onto a transport vehicle (e.g., a barge 36). A loader (32a) may operate in the receiving area (20) to load the loose waste (28) into the baler (22). At least one material handler (42a) may be configured to move the waste bales (34) onto the transport vehicle (36) for transport to a waste transfer facility (14). The waste bales (34) are configured such that the waste bales are unloaded from the transport vehicle (36) at the waste transfer facility (14) and loaded onto other transport vehicles (e.g., railcars 38) without further processing of the waste bales (34).

18 Claims, 9 Drawing Sheets

U.S. PATENT DOCUMENTS

| | | | |
|---|---|---|---|
| 3,686,889 A * | 8/1972 | Harza | 62/62 |
| 3,753,506 A * | 8/1973 | Palmer et al. | 414/332 |
| 3,962,965 A * | 6/1976 | Corompt | 100/99 |
| 4,256,434 A * | 3/1981 | Stodt et al. | 414/809 |
| 4,995,780 A | 2/1991 | Dietzler | |
| 5,060,452 A | 10/1991 | Tabor | |
| 5,148,758 A * | 9/1992 | Saly et al. | 110/220 |
| 5,541,386 A * | 7/1996 | Alvi et al. | 219/121.38 |
| 5,596,864 A | 1/1997 | Reeves | |
| 5,794,862 A * | 8/1998 | Toor | 241/21 |
| 6,336,306 B1 | 1/2002 | Sieger et al. | |
| 6,715,410 B2 | 4/2004 | Boucher et al. | |
| 6,877,293 B2 | 4/2005 | Underhill | |
| 7,127,985 B2 | 10/2006 | Standlee | |

FOREIGN PATENT DOCUMENTS

| | | |
|---|---|---|
| EP | 0798044 A1 | 10/1997 |
| GB | 2280888 A | 2/1995 |

* cited by examiner

SYSTEMS AND METHODS OF PROCESSING AND TRANSPORTING WASTE

CROSS-REFERENCE TO RELATED APPLICATIONS

This application is a national stage filing based upon international application no. PCT/US2006/019117, filed 16 May 2006 and published in English on 23 Nov. 2006 under international publication no. WO 2006/125017 A2, which claims priority to U.S. provisional patent application No. 60/681,896, filed 16 May 2005, and to U.S. provisional patent application No. 60/689,411, filed 10 Jun. 2005. Each of these three applications is hereby incorporated by reference as though fully set forth herein. This application is also related to U.S. nonprovisional application Ser. No. 11/718,237, filed on 29 Apr. 2007 as a national stage of international application no. PCT/US2006/022903 (filed 12 Jun. 2006), now pending.

BACKGROUND OF THE INVENTION a. Field of the Invention

The instant invention relates generally to management of waste, and more particularly, to systems and methods of processing and transporting waste.

b. Background Art

Residential and/or commercial waste is typically collected by trucks and transported to a local disposal facility (e.g., a landfill or incinerator), or to a local transfer station where the waste may then be transferred to a remote disposal facility (e.g., by barge, railcar, another truck, etc.). After arriving at the disposal facility, the waste may be deposited directly into a landfill or incinerator, or processed (e.g., sorted, sized, and/or classified) and baled before being placed in the landfill or incinerator, possibly after a storage period.

Although the waste may be somewhat compacted by the trucks, it is generally considered to be "loose" waste. Transporting loose waste introduces physical and economic challenges. By way of example, vehicles (e.g., trucks, barges, railcars) are often filled with loose waste long before approaching the vehicle's weight-carrying capacity. If the waste is further compacted directly in the vehicle and/or shipping container for transporting the waste, the vehicle and/or shipping container may need to be reinforced, thereby making the vehicle and/or shipping container heavier and more expensive than might otherwise be needed. Reinforced vehicles and/or shipping containers also weigh more, thereby reducing the available weight-carrying capacity.

Transporting loose waste also gives rise to environmental and regulatory considerations. Loose waste may also decay during transit; and, therefore, the vehicles and/or shipping containers often require extensive cleaning and/or decontamination before they can be reused. The cleaning and decontamination processes also create waste (often liquid waste) that must be further processed. In addition, loose waste may blow away after being dumped (e.g., at the disposal facility), or may blow out of the transportation vehicle as the vehicle moves. Loose waste also attracts birds and other vermin, which may carry disease. Accordingly, it is often mandated by law that loose waste be transported in an environmentally secure manner, and that loose waste be transported by dedicated vehicles and/or shipping containers. These dedicated containers or vehicles are returned to their point of origin empty, further increasing cost and reducing efficiencies.

BRIEF SUMMARY OF THE INVENTION

It is desirable to more cost-effectively and efficiently process and transport waste. Systems and methods described herein may be implemented to bale waste for efficient transport. Baled waste reduces or altogether eliminates odor and contamination issues, such as, blowing debris during transport and at the waste disposal facility. In addition, if waste is baled appropriately, the shipping containers or vehicles used for transporting the waste may be reused, and may even be used for other purposes, without extensive cleaning or decontamination.

Exemplary embodiments may implement sealed waste bales, including but not limited to hermetically-sealed bales. A sealed environment quickly depletes the available oxygen for aerobic digestion and reduces decay during transit. In addition, a sealed environment reduces odors associated with the waste, and the infestation of birds, rodents, and other vermin. Sealed bales may also be stored temporarily (e.g., up to six months) at a baling plant, in transit, and/or at a disposal or recycling facility without having to be covered.

An exemplary waste processing and transportation system may comprise a receiving area where loose waste is delivered, a baler for processing the loose waste into waste bales, and a loading area where the waste bales are loaded onto a transport vehicle. At least one loader may operate in the receiving area, the at least one loader loading the loose waste into the baler. At least one material handler may be configured to move the waste bales onto the transport vehicle for transport to a waste transfer facility. The waste bales are configured such that the waste bales are unloaded from the transport vehicle at the waste transfer facility and loaded onto other transport vehicles without further processing the waste bales.

An exemplary method may comprise receiving loose waste at a waste processing facility, converting the loose waste into waste bales configured to be loaded and unloaded without further processing prior to reaching a waste disposition facility, and loading the waste bales onto a transport vehicle for transport to a waste transfer facility where the waste bales are unloaded from the transport vehicle and re-loaded onto different types of transport vehicles.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
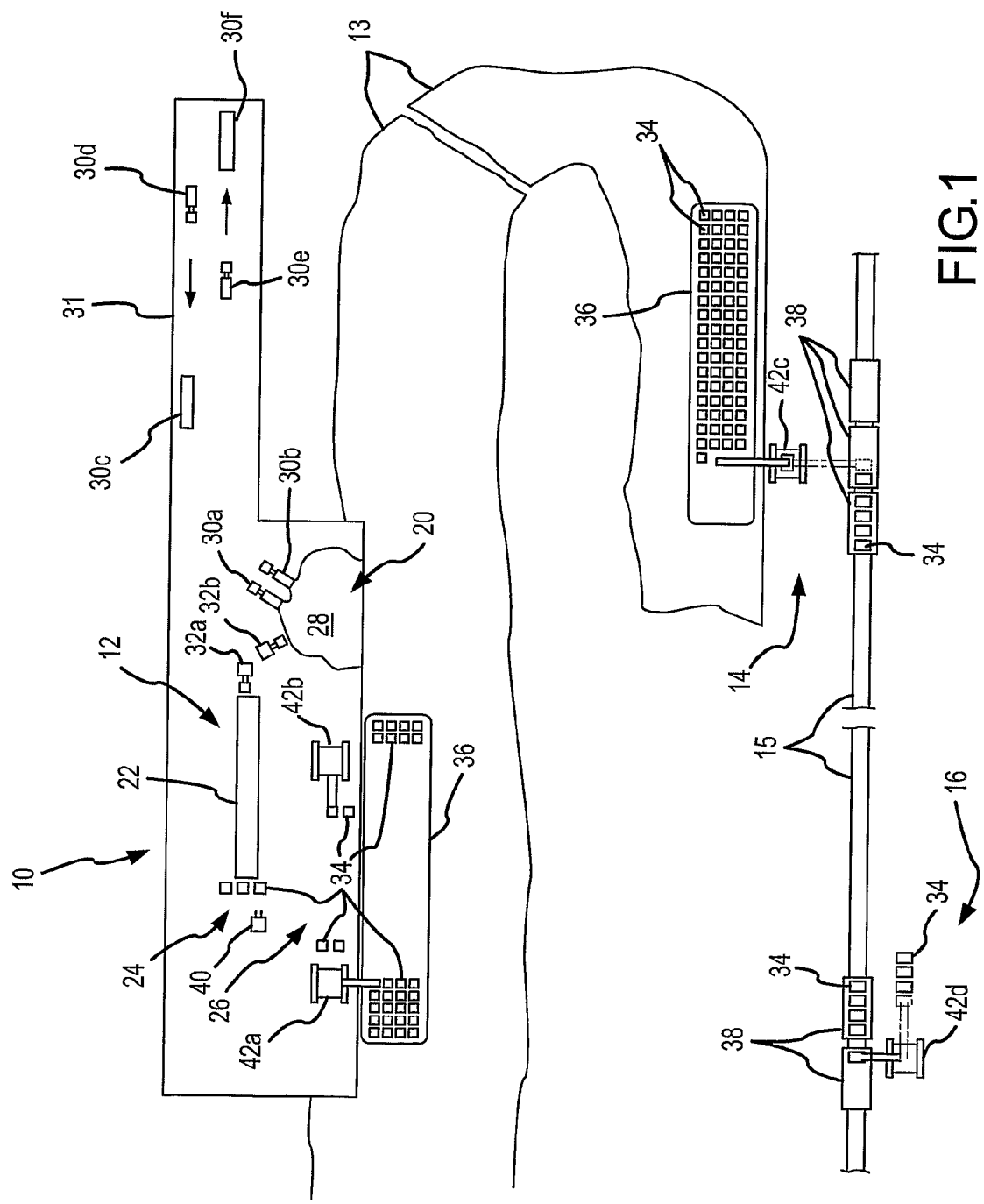
FIG. 1 is a top plan view of an exemplary waste processing and transportation system according to the present invention.

FIG. 1 is a top plan view of an exemplary waste processing and transportation system 10 according to the present invention. Exemplary system 10 may comprise a waste processing facility 12, a waste transfer facility 14, and a waste disposition facility 16 (e.g., disposal, incineration, recycling, and/or energy conversion facility). In the exemplary embodiment shown in FIG. 1, the waste processing facility 12 is linked to the waste transfer facility 14 via a waterway 13; and the waste transfer facility 14 is linked to the waste disposition facility 16 via a railway 15. It is noted, however, that the system 10 is not limited to any particular configuration. For example, waste processing facility 12, waste transfer facility 14, and waste disposition facility 16 may be operatively associated with one another via roads, waterways, railways, and/or any combination thereof. In addition, the waste processing facility 12 may be operatively associated with a plurality of waste transfer facilities 14 and/or a plurality of waste disposition facilities 16.

An exemplary waste processing facility 12 may include one or more of the following: a receiving area 20, a baler 22, a staging area 24, and a loading area 26. The receiving area 20 may be provided for receiving loose waste 28 (e.g., municipal solid waste, construction and demolition waste, and/or other waste). During operations, the loose waste 28 may be transported to the receiving area 20 by trucks 30a-f, and/or any other suitable transport vehicles (e.g., barges and/or railcars).

By way of example, waste processing facility 12 may include truck access 31 via which the trucks 30a-f deliver the loose waste 28 to the receiving area 20. The trucks 30a-f may be weighed at a scale (not shown) when entering and/or exiting the waste processing facility 12 to determine the weight of the loose waste 28 being delivered. It is noted that any number of scales may be used to weigh the trucks 30a-f entering and exiting the waste processing facility 12. For example, trucks 30a-f may only be weighed upon entry if each truck's empty weight (or tare) is known or assumed. Alternatively, the loose waste 28 does not need to be weighed at all as it is delivered, and the weight of the waste may instead be determined prior to transport (e.g., during processing by the baler 22).

The trucks 30a-f may unload the loose waste 28 in the receiving area 20, e.g., onto a tipping floor. The loose waste 28 may then be retrieved from the tipping floor and loaded into the baler 22. For example, one or more loaders 32a-b may be operated to retrieve the loose waste 28 from the tipping floor and deposit it into an entry hopper of the baler 22 (as illustrated at entry hopper 50 in FIG. 2).

The baler 22 may be provided to process the loose waste 28, e.g., by sorting, sizing, shredding, and/or packaging the loose waste 28 into waste bales 34. In an exemplary embodiment, the baler 22 may be a SpeedBaler™ baler, which is used, among other places, in the United States and Europe. Each SpeedBaler™ baler may, for example, produce approximately 45 to 50 tons per hour of baled waste in approximately 1.25 ton waste bales. Thus, 1500 tons per day of loose waste may be processed in under two eight-hour shifts when two such SpeedBalers™ are implemented at the waste processing facility 12. Although cylindrical bales like those produced by some balers, including SpeedBalers™, can be used as the baler 22 shown in FIG. 1, any type of baler, including balers that produce other than cylindrical bales (e.g., spherical bales or bales having generally rectangular cuboid shapes, including cubes and rectangular parallelepipeds), may be used in the waste processing and transportation system 10 depicted in FIG. 1.

It is noted that more than one baler 22 may be provided to increase throughput at the waste processing facility 12. For example, providing a plurality of balers 22 may enable the waste processing facility 12 to better keep up with the amount of loose waste 28 being delivered, thereby reducing accumulation in the receiving area 20. In addition, one or more secondary or "backup" balers (not shown) may also be provided and brought on-line in the event that one of the primary balers (e.g., baler 22) fails or needs maintenance. Accordingly, throughput at the waste processing facility 12 may be scaled and maintained even if one or more of the primary balers must be temporarily or permanently taken offline.

Data on the weight or volume of the waste being processed may be determined in any manner. In an exemplary embodiment, loose waste 28 and/or waste bales 34 may be weighed within the baler 22 or at any location at the processing facility and/or even downstream of the processing facility. In another exemplary embodiment, the weight or volume of the waste being processed may be calculated or approximated by counting the number of bales 34 and multiplying the number of waste bales by the average or anticipated weight or volume of each waste bale 34.

It is noted that, in addition to being any shape or configuration, the waste bales 34 may be wrapped or unwrapped, and sealed (e.g., wrapped in a solid, liquid-proof material) or unsealed (e.g., unwrapped or wrapped in a mesh or porous material). For purposes of illustration, the waste bales 34 may include hermetically-sealed bales, airtight bales, watertight bales, enveloped bales, encircled bales, mesh-wrapped bales, and twine-wrapped bales, to name only a few examples.

In an exemplary embodiment, the loose waste 28 is wrapped in a substantially airtight and watertight layer such that the bale itself serves as an "intermodal container." That is, the waste bales 34 are capable of being transported via multiple modes of transportation without requiring an external container.

Alternatively, the waste bales 34 may be placed into closable shipping containers (not shown), such as, e.g., standard, twenty-foot ISO dry freight intermodal containers. For purposes of illustration, twenty forty-five inch diameter by forty-five inch height finished cylindrical bales may be placed in a standard, twenty-foot ISO dry freight intermodal container. Twenty such waste bales 34 may be arranged in such a standard shipping container in two vertical layers with each layer having two bales across the width and five bales deep. With approximately 1.25 ton waste bales, each intermodal shipping container would then contain a net waste bale weight of approximately 25 tons.

Optionally, the waste bales 34 and/or shipping containers may be provided with a bar code or other machine or human-readable identifying means (e.g., optical code, punch card, electronic or electromagnetic storage medium, radio frequency tag, printed or painted label or the like) that allows for tracking the waste bales 34, either individually or collectively (e.g., by a lot number, a date of processing, delivery, or the like).

The waste bales 34 may remain in staging area 24 (e.g., adjacent the baler 22 or in another temporary storage area) before being moved to the loading area 26 and eventually loaded onto one or more type of transport vehicles, such as, e.g., the barges 36 and/or the railcars 38. One or more material handlers, such as, e.g., the forklift 40 and/or the cranes 42a-b may be provided at the waste processing facility 12 to move the waste bales 34, e.g., from the baler 22 to the staging area 24 and/or to the loading area 26 and/or directly onto the transport vehicle (e.g., barge 36).

As mentioned above, the waste bales 34 may themselves serve as intermodal containers, which are loaded directly onto the barge 36 without the need for further containerization. According to such an embodiment, the waste bales 34 may be arranged in one or more layers to maximize the storage area and weight-carrying capacity of the barge 36. The waste bales 34 may also be tightly fitted into the railcar to prevent the waste bales 34 from moving during transport. Where at least one of the waste bales 34 extends above a side wall of the barge 36, the barge 36 may be fitted with optional protective rails (e.g., similar to the protective rails 96 shown on the railcar 38' depicted in FIG. 7) to prevent the waste bales 34 from falling or rolling off the barge 36 during transport. In addition, other support mechanisms (e.g., tie-down straps, ropes, or chains) may also be implemented to reduce movement during transport.

Alternatively, shipping containers, like the intermodal containers described above, containing the waste bales 34 may be loaded in multiple layers on the deck of the barge 36 for transport via the waterway 13. In one embodiment, for example, thirty-six fully-loaded ISO dry freight intermodal shipping containers can be loaded onto a single barge 36. That is, the shipping containers may be loaded on the deck of the barge 36 in two layers, with each layer comprising three shipping containers across the width of the barge 36 and six shipping containers along the length of the barge 36 for a net waste bale weight of approximately 900 tons, assuming each shipping container contains twenty 1.25 ton bales.

After being loaded at the waste processing facility 12, the transport vehicle (e.g., the barge 36) may transport the waste bales 34 to the waste transfer facility 14 (e.g., an intermodal facility, a transload facility, a private yard, or other facility). For example, barge 36 loaded with waste bales 34 may navigate the waterway 13 and arrive at the transfer facility 14 where the waste bales 34 may be unloaded. One or more material handler, such as crane 42c, may transfer the waste bales 34 directly to other transport vehicles, such as the railcars 38. Alternatively, the waste bales 34 may be unloaded and left in a staging area for temporary storage at the transfer facility 14. The barge 36 may then return to the waste processing facility 12 for another load, or it may be used for other purposes (e.g., transporting freight). The transport vehicle (e.g., barge 36) and/or shipping containers (if used) may optionally be loaded with another cargo and/or returned to the origination point after only little, if any, decontamination when the waste bales 34 are sealed to keep the transport vehicle and/or shipping containers at least somewhat clean.

Figure 7:
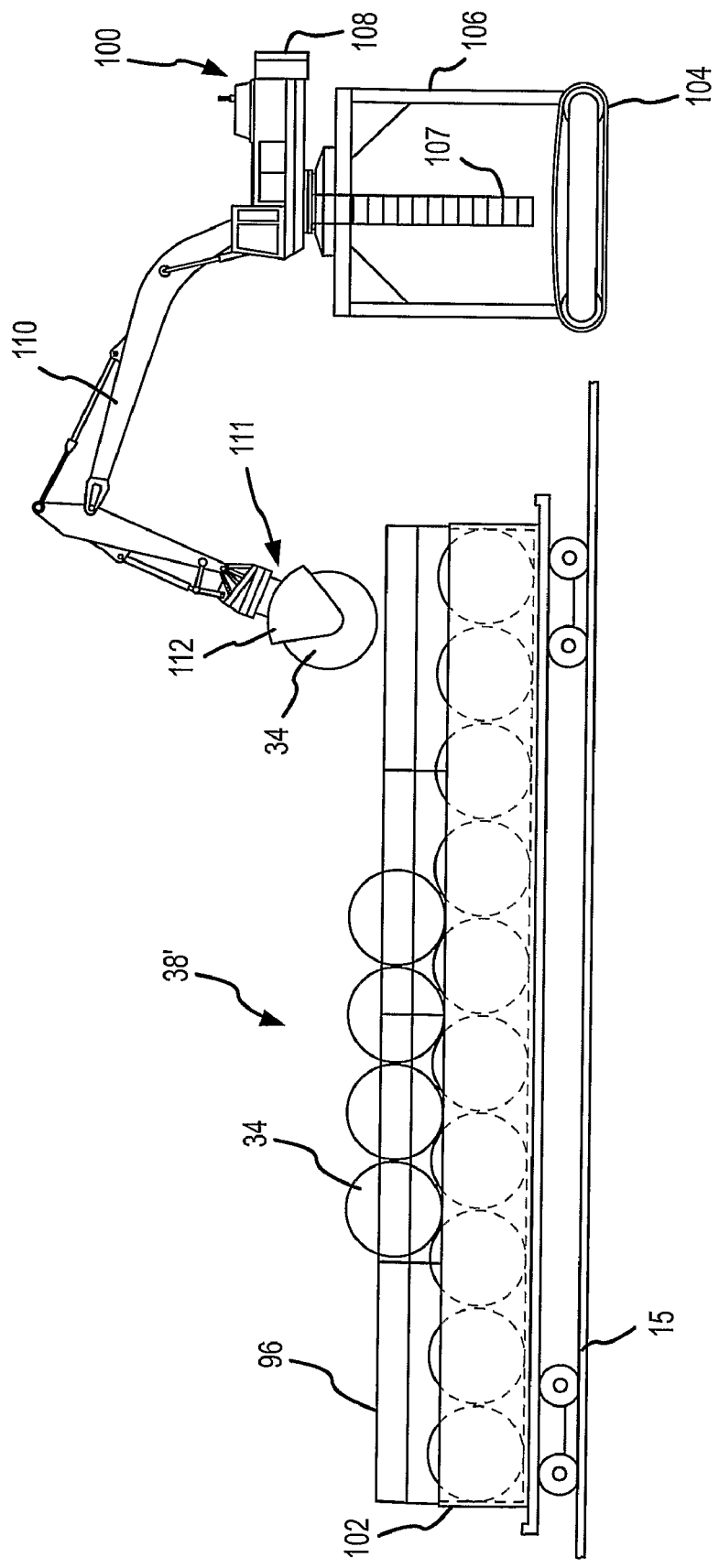
FIG. 7 is a side elevation of another exemplary material handler shown as it may be implemented to load/unload a railcar.

Again, the railcars 38 may be loaded to maximize their storage area and weight-carrying capacity so that the shipping cost per unit of waste (e.g., weight and/or volume) is minimized. For example, a gondola railcar may be loaded with two layers of waste bales 34 that fully extend from one side of the gondola to the opposite side of the gondola. The waste bales 34 may also be fit tightly into the storage area of the railcars 38 to minimize movement of the waste bales 34 during transport. As shown in FIG. 7, if the waste bales 34 extend above a side wall 102 of the railcar 38', the railcar 38' may optionally be fitted with protective rails 96 to prevent the waste bales 34 from falling or rolling off during transport. Additional support mechanisms (e.g., tie-down straps, ropes, or chains) may also be implemented to prevent the waste bales 34 from moving during transport.

After being loaded at the transfer facility 14, the other transport vehicles (e.g., railcars 38) may transport the waste bales 34 to another transfer facility (not shown) or the waste disposition facility 16. One or more material handler, such as crane 42d, may unload the waste bales 34. Alternatively, the railcars 38 may be tipped to allow the waste bales 34 to roll or fall out of the railcars 38. The waste bales 34 may then be finally disposed of, for example, by depositing in a landfill, incineration, burning as fuel at a waste-energy plant, or recycled. The railcars 38 may then return to the transfer facility 14 for another load, or be used for other purposes (e.g., transporting freight).

It is noted that the barge 36 and railcars 38 (and optionally the containers) are protected from the waste by the bale wrappers. Accordingly, the barge 36 and railcars 38 need not be dedicated to hauling waste and may be diverted to pick up cargo nearby without requiring much, if any, decontamination and cleaning. Thus, the barge 36 and railcars 38 (and optionally the containers) may be re-used to transport an alternate cargo without having to be decontaminated or shipped back empty for the next load of waste.

FIG. 1 shows merely one possible configuration of a waste processing and transportation system 10 according to the present invention. Other exemplary systems are also contemplated as being within the scope of the invention. For example, where a marine transfer station is available for receiving loose waste (e.g., via truck, barge, and/or rail) and a disposal facility is available for receiving waste via barge as well, loose waste may be received, processed, and baled at the marine transfer station, and the bales may be transported by barge from the marine transfer station directly to the disposal facility. Similarly, a disposal facility may receive waste bales directly from a waste processing facility via rail and/or truck, without requiring an intermediate facility to transfer the waste bales between types of transport vehicles. In addition, any number of transport vehicles and types of transport vehicles may be implemented based on the transportation needs in a particular system and/or other design considerations.

Figure 2:
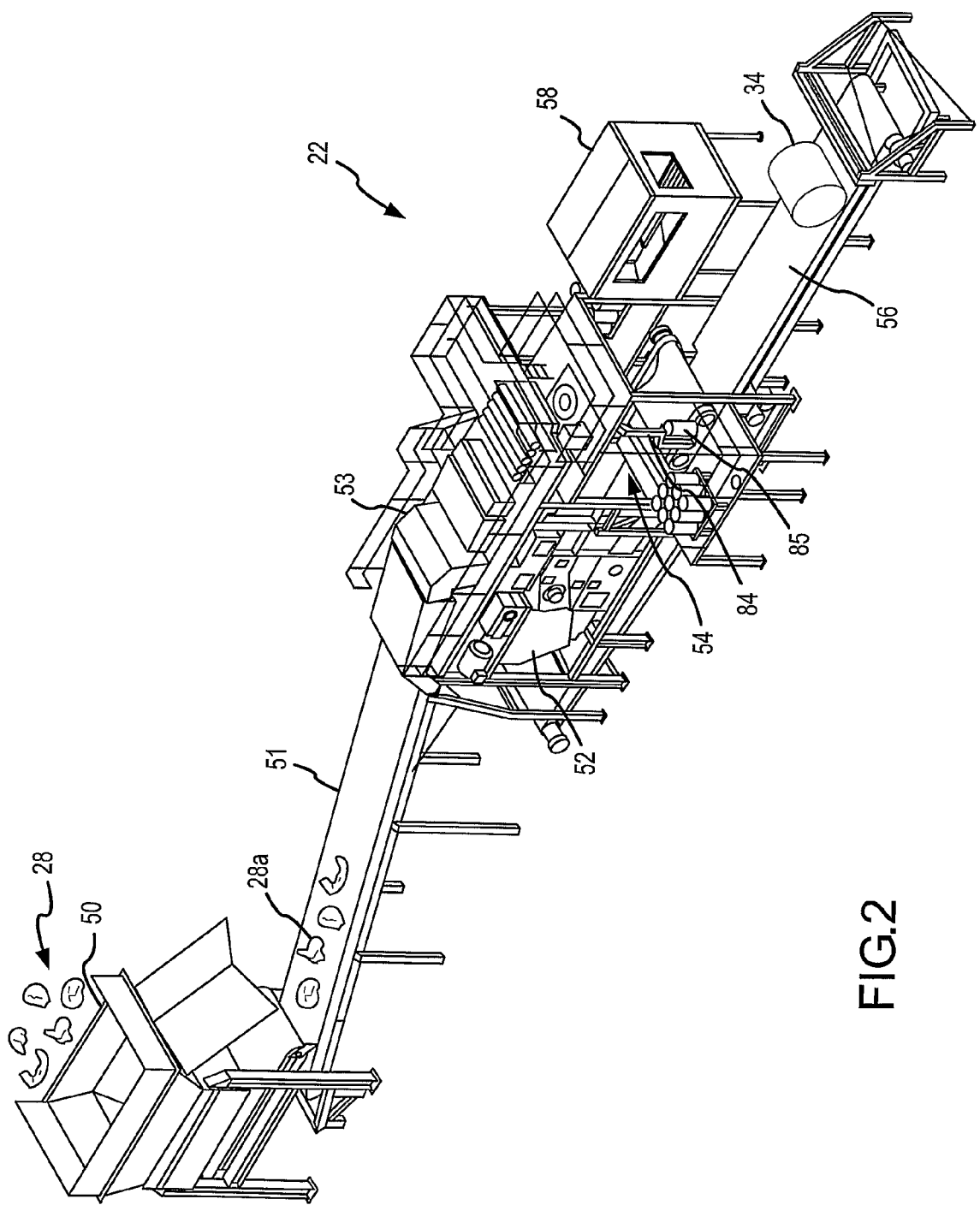
FIG. 2 is an isometric view of an exemplary baler that may be implemented as part of the waste processing and transportation system shown in FIG. 1.

FIG. 2 is an isometric view of an exemplary baler 22 that may be implemented as part of the waste processing and transportation system 10 shown in FIG. 1. As mentioned above, loose waste 28 may be loaded into an entry hopper 50. In an exemplary embodiment, the entry hopper 50 may be implemented as a combination shredder/hopper. The shredder/hopper shreds the loose waste 28 to generate a substantially uniformly-sized waste material 28a for easier handling and delivery to a baling chamber 52. The baler 32 may further comprise a feed conveyor 51 to transfer the waste material 28a to the baling chamber 52.

In an exemplary embodiment, the baling chamber 52 may include a cylindrical area to roll and compact the shredded waste material 28a, thereby packing and compressing the waste material 28a for baling. The waste material 28a may be "pre-baled" (e.g., secured by a netting or mesh material 73 best seen in FIG. 3) so as to maintain a cylindrical shape for transfer to a wrapping station 54. An exemplary baling chamber 52 and operation thereof is described in more detail below with reference to FIG. 3.

The pre-baled waste (e.g., pre-baled waste 74 shown in FIG. 3) may then be transferred to wrapping station 54 for further wrapping. An exemplary wrapping station 54 and operation thereof is described in more detail below with reference to FIG. 4. The finished waste bales 34 exit the baler 22 on an exit conveyor 56.

Exemplary baler 22 may further comprise a control room 58. In an exemplary embodiment, the control room 58 may be implemented to control the operation of the baler 22, e.g., by operators and/or an automated control system.

Before continuing, it is noted that the exemplary baler 22 is shown and described herein merely for purposes of illustration as one such baler that may be implemented to process loose waste. Any type of baler or balers may be implemented for the waste processing and transportation system 10. For example, U.S. Pat. No. 5,784,856 issued on 28 Jul. 1998 discloses a round bale press that may be used to process loose waste into a waste bale. U.S. Pat. No. 5,727,359 issued on 17 Mar. 1998 discloses a wrapping table for receiving and rotating a round bale to be wrapped and a waste packaging apparatus including such a wrapping table. U.S. Pat. No. 6,336,306 issued on 8 Jan. 2002 discloses a round bale press for compressing waste into round bales. In addition, U.S. Pat. No. 6,971,220 issued on 6 Dec. 2005 discloses a method of wrapping a round bale compacted by a round baler, a film-wrapping device, and a round baler that is provided with such a film-wrapping device. Each of these patents and the application cited above are hereby incorporated by reference as though fully set forth herein.

Figure 3:
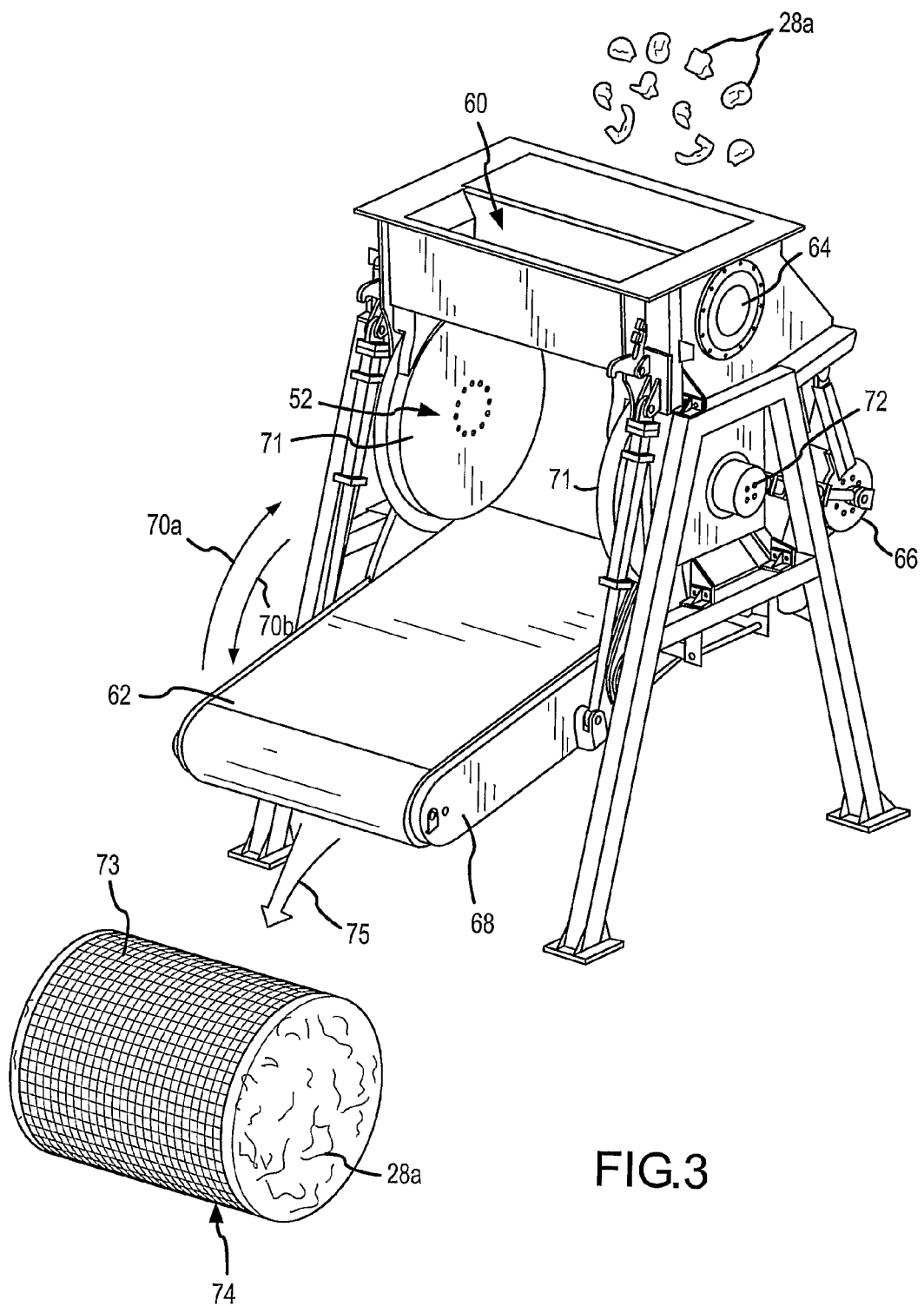
FIG. 3 is an isometric view of a baling chamber that may comprise part of the baler shown in FIG. 2.

FIG. 3 is an isometric view of an exemplary baling chamber 52 that may be provided as part of the baler 22 shown in FIG. 2. Exemplary baling chamber 52 receives waste material 28a, e.g., from the feed conveyor 51 shown in FIG. 2. As mentioned above, baling chamber 52 may be implemented to roll and compact the waste material 28a to form a generally cylindrical bale of waste.

In an exemplary embodiment, baling chamber 52 may include a top feed opening 60 for receiving shredded waste material 28a from the feed conveyor 51. The baling chamber 52 further comprises a press belt 62 that wraps around a drive roller 64, a tension roller 66, and a tailgate 68. Although the tailgate 68 is shown in an open configuration in FIG. 3, the tailgate closes (e.g., in the direction illustrated by arrow 70a) during the baling operation and, along with the end plates 71, one of both of which maybe operably connected to a press hub assembly 72, forms a closed chamber. The drive roller 64 drives the press belt 62 about the tension roller 66, and the tailgate 68 to roll the waste material within the baling chamber 52. The tension roller 66 applies tension to the press belt 62 to compact the waste material 28a as it is being rolled and tumbled within the baling chamber 52.

The baling chamber 52 may further comprise a hoop wrapper 53 (e.g., shown in FIG. 2) that wraps the cylindrical unit of waste material 28a in a mesh material 73 (see FIG. 3) within the baling chamber to hold the bale in a tight, compacted, substantially-cylindrical form (e.g., pre-baled waste 74). For example, mesh material 73 may comprise a high density polyethylene (HDPE) netting wrapped around the waste material 28a to form the pre-baled waste 74.

After the waste material 28a has been pre-baled, the tailgate 68 opens (e.g., in the direction indicated by arrow 70b) and the press belt 62 is rotated to transfer the pre-baled waste 74 out of the baling chamber 52 (e.g., as illustrated by arrow 75 in FIG. 3). The pre-baled waste 74 exits the baling chamber 52 and is transferred to the wrapping station 54 (FIGS. 2 and 4).

Figure 4:
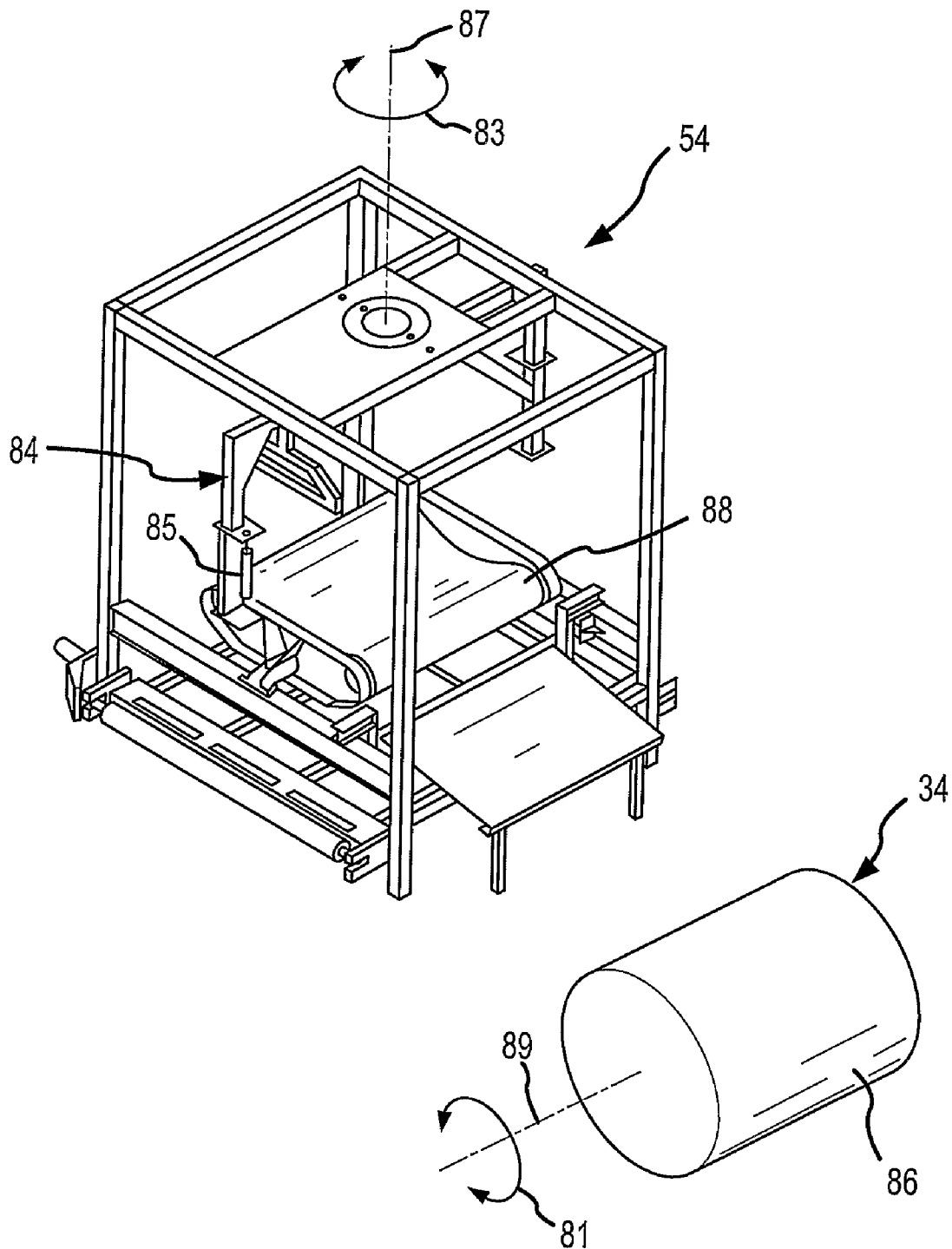
FIG. 4 is an isometric view of a wrapping station that may comprise part of the baler shown in FIG. 2.

FIG. 4 is an isometric view of an exemplary wrapping station 54, which may be provided as part of the baler 22 shown in FIG. 2. The wrapping station 54 may be implemented to wrap the pre-baled waste 74 (FIG. 3) about both the cylindrical outer surface of the bale and the circular, longitudinal ends of the bale.

The wrapping station 54 may include, for example, a "heli-wrapper" 84 (see, e.g., FIGS. 2 and 4) that wraps the pre-baled waste by rotating one or more rolls 85 of wrapping material 86 around the pre-baled waste as the heli-wrapper rotates about axis 87 in one of the directions indicated by arrow 83. As the heli-wrapper 84 rotates, a conveyor 88 may rotate the pre-baled waste in place about its longitudinal axis 89 in one of the directions indicated by arrow 81. The combined actions of the heli-wrapper 84 and the conveyor 88 distribute the wrapping material 86 to the entire outer surface of the bale 34, as shown in FIG. 4.

Any suitable wrapping material 86 may be implemented. In an exemplary embodiment, wrapping material 86 may comprise plastic sheeting, such as, a linear, low density polyethylene film (LLDPE) sheet material. Such plastic sheeting creates an airtight and watertight seal around the waste material. In an exemplary embodiment, the plastic sheeting may comprise an adhesive on at least one side to assist in forming an airtight and watertight sealed containment about the bale. In another exemplary embodiment, the plastic sheeting may be treated to resist ultra-violet (UV) degradation.

After the wrapped bale 34 is fully formed, the plastic sheet material is cut, and the baled waste 34 is discharged from the wrapping station 54 onto a conveyor (e.g., exit conveyor 56 shown in FIG. 2). The resulting baled waste 34 may be a uniform size and/or consistent weight (e.g., 1.25 tons apiece or 7 tons apiece). The size and volume may be selected for a particular application and designed to fully take advantage of the size and/or weight capacity of one or more transport vehicles.

Figure 5:
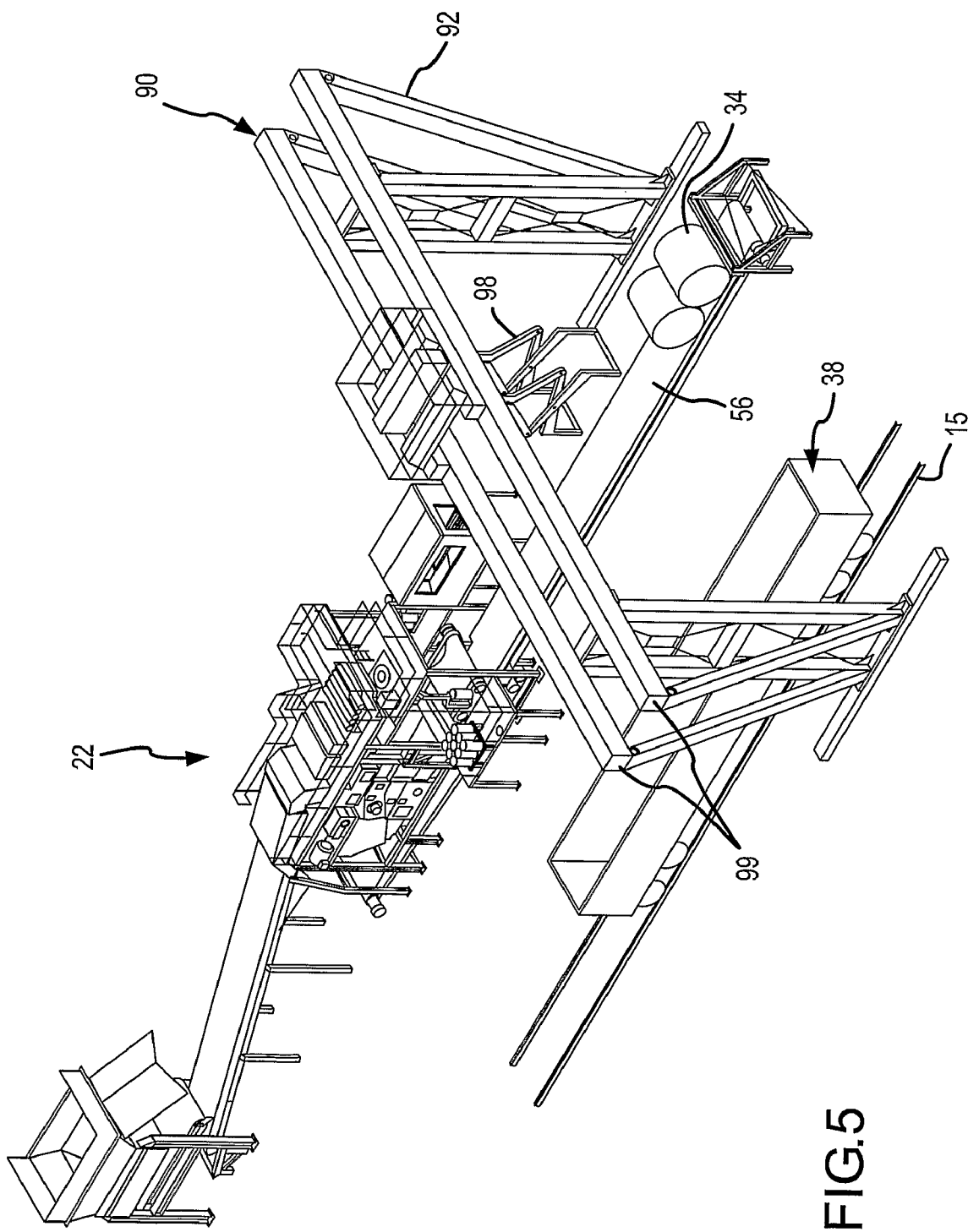
FIG. 5 is an isometric view of the baler shown in FIG. 2 as it may be used with an exemplary material handler.
Figure 6:
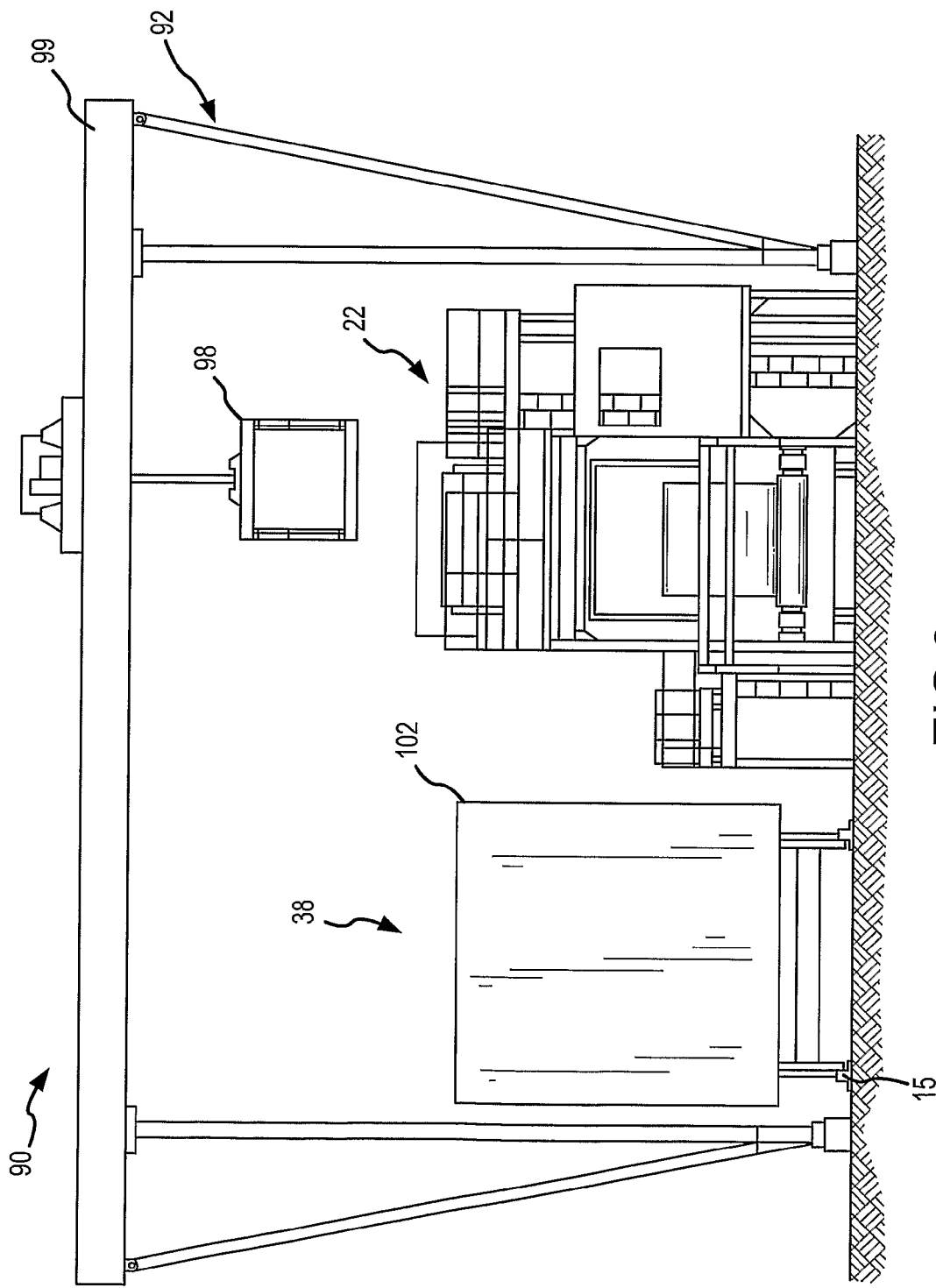
FIG. 6 is a front elevation of the material handler shown in FIG. 5.

FIG. 5 is an isometric view of the baler 22 shown in FIG. 2 as it may be used with an exemplary material handler 90. FIG. 6 is a front elevation of the material handler 90 shown in FIG. 5. Material handler 90 (e.g., material handlers 42a-d in FIG. 1) may include a crane support structure 92, which spans the baler 22, and, in this example, a railway 15 including railcar 38 (e.g., the railcars 38 shown in FIG. 1). It is noted, however, that the material handler 90 may be implemented with any suitable transport vehicle (e.g., a barge or truck).

In an exemplary embodiment, the material handler 90 may include a crane 98 moveable along a pair of rails 99 on the crane support structure 92 at least between the exit conveyor 56 of baler 22 and the railway 15. During operations, the crane 98 may slide along the pair of rails 99 on the crane support structure 92 until the crane 98 is substantially over the exit conveyor 56 of the baler 22. The crane 98 may then be lowered to retrieve at least one of the waste bales 34 from the exit conveyor 56 and retracted to lift the waste bale off of the exit conveyor 56. The crane 98 may then slide back along the rails 99 toward the railway 15 until the waste bale 34 being held by the crane 98 is positioned substantially over the railcar 38. The crane 98 may then be lowered to place the waste bale 34 into the railcar 38. After releasing the waste bale 34, the crane 98 may be retracted at least far enough to clear the railcar 38. The crane 98 may then slide back across the crane support structure 92 to retrieve additional waste bales 34 until the railcar 96 is loaded or otherwise ready to leave. As described above, the railcar 38 may be loaded in one or more layers to maximize the weight-carrying and volume capacity of the railcar.

It is noted that material handler 90 may be implemented for any transport vehicle and at any facility (e.g., waste processing facility 12, waste transfer facility 14, and/or waste disposition facility 16). The material handler 90 is not limited to use with baler 22 and railcar 38. These are merely shown in FIGS. 5 and 6 for purposes illustration of one such implementation.

FIG. 7 is a side elevation of another exemplary material handler 100 shown loading/unloading a railcar 38'. For purposes of illustration, FIG. 7 depicts an exemplary gondola railcar 38' loaded with ten cylindrical bales 34 on a bottom row of bales. The second or top row of bales 34 is being loaded in FIG. 7. As also shown in FIG. 7, the railcars 38' may include an optional protective rail 96 attached to the side walls 102 of the railcar 38'. The protective rail 96 extends upwardly from the side walls 102 of the railcar 38' and protects the bales 34 from contact with branches, etc. during transport, and may prevent the bales 34 in the upper layer of bales from rolling out of the gondola railcar 38'. In another possible loading configuration, fifteen 7-foot-long bales are arranged in two layers within the railcars. The base layer comprises eight bales, and the second or top layer comprises seven bales.

Figure 8:
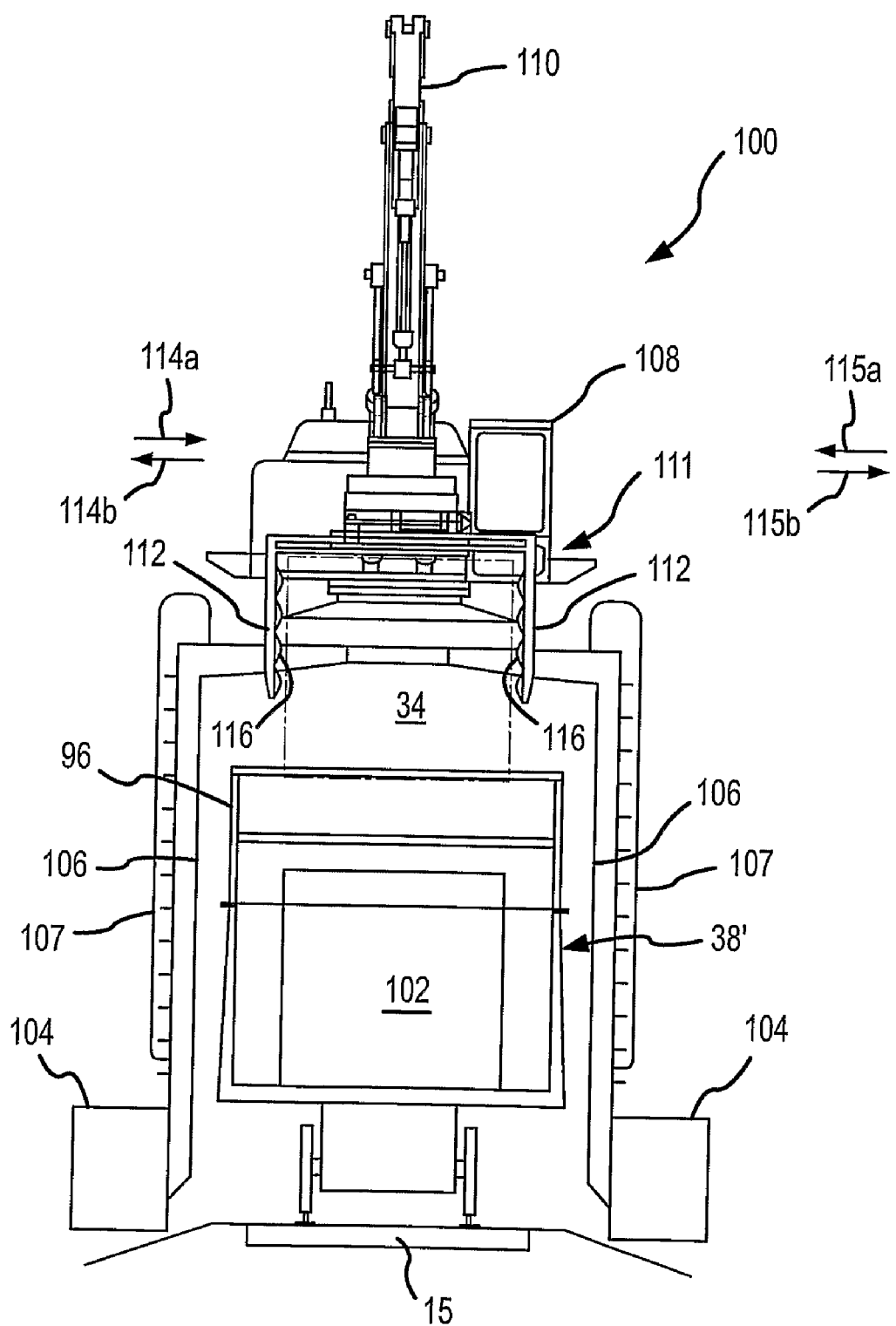
FIG. 8 is a front elevation of the material handler and railcar shown in FIG. 7.

FIG. 8 is a front elevation of the material handler 100 and railcar 38' shown in FIG. 7. Again it is noted that railcar 38' (e.g., railcars 38 shown in FIG. 1) is shown merely for purposes of illustration and that the material handler 100 (e.g., material handlers 42a-d in FIG. 1) may be implemented with any suitable transport vehicle (e.g., a barge or truck) and at any facility in the system (e.g., the system 10 shown in FIG. 1).

Exemplary material handler 100 may comprise a pair of tracks 104 for moving the material handler 100. The material handler 100 comprises a support structure 106 extending upward from the pair of tracks and supporting an excavator 108 (e.g., a Caterpillar model 330 Hydraulic Excavator or other material handling equipment). The support structure 106 may comprise a ladder 107 for providing an operator with access to the excavator 108. The support structure 106 may also comprise counterweights (not shown) to help balance the load and reduce the possibility of tipping due to the weight of the excavator 108 and/or waste bales 34.

In an exemplary embodiment, the support structure 106 may be wider than the railcar 38' and the railway 15 on which the railcar 38' travels (e.g., 12 feet, 0.5 inches between each inner surface of the support structure). The support structure 106 may also be taller than the railcar 38' after it is loaded with at least two layers of baled waste 34 (e.g., 16 feet, 9 inches for 2 layers of 6 foot, 7 inch diameter bales loaded into a gondola railcar). Accordingly, the material handler 100 may be operated to travel over the railcar 38' (or the railcar operated to travel underneath the support structure 106) for loading/unloading operations.

Exemplary material handler 100 may also include a material handler arm 110, which may be extendable into the railcar 38' to load one or more waste bales 34 onto, or unload one or more waste bales 34 from, the railcar 38'. Material handler arm 110 may include a bale handler 111 configured to grasp and release the waste bales 34. In an exemplary embodiment, bale handler 111 may comprise a pair of end plates 112 for grasping the generally flat ends of the baled waste 34. The end plates 112 may be moveable (e.g., operable by a pair of hydraulic cylinders) relative to each other in the directions illustrated by arrows 114a, 115a in FIG. 8 to grasp the waste bales 34, or in the directions illustrated by arrows 114b, 115b to release the waste bales 34. It is noted that the grasping action may be accomplished by moving both end plates 112 toward one another. Alternatively, the grasping action may be accomplished by only moving one of the end plates 112 relative to the opposite end plate, which may remain in a fixed position.

Optionally, bale handler 111 may be operated to rotate (e.g., 360 degrees) at the distal end of the material handler arm 110 for readily positioning the waste bales 34 in the transport vehicle in any desired configuration. Also optionally, the bale handler 111 may include teeth 116 (e.g., blunt extensions or protrusions extending inwardly from the end plates 112 as shown in FIG. 8) configured to grasp the waste bales 34 without puncturing the wrapping material.

Figure 9:
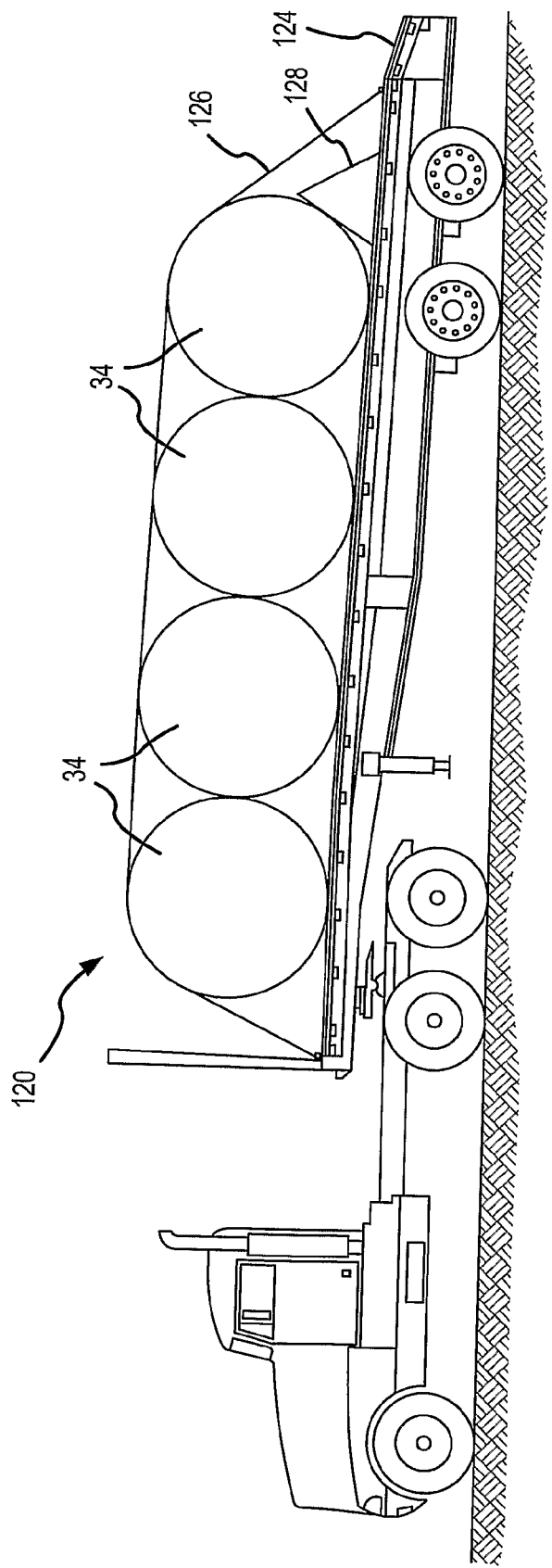
FIG. 9 is a side elevation of an exemplary transport vehicle shown as it may be loaded with baled waste.

FIG. 9 is a side elevation of an exemplary transport vehicle 120 shown loaded with bales 34. The exemplary transport vehicle 120 shown in FIG. 9 is a truck configured with a flatbed trailer 124. It is noted, however, that transport vehicles for use with the present invention are not limited to any particular type or configuration of truck. Nor is the present invention limited to use with trucks, and may also be implemented with other transport vehicles, such as, e.g., the barges and railcars described above.

As described above, the waste bales 34 may themselves serve as "intermodal containers" that may be transported directly on the trailer 124 without requiring any additional containerization. The waste bales 34 may be loaded onto the trailer 124 as described above, e.g., by material handlers 90 and 100 (FIGS. 5-8). In an exemplary embodiment, the waste bales 34 may be secured to the flatbed trailer 124 via at least one tie-down strap 126 and a removable block 128. For purposes of illustration, a single flatbed trailer 124 may haul four waste bales 34, each of which is approximately 8.404 cubic yards (eighty inches long by seventy-nine inches in diameter) and weighs about 6.72 tons for a total of approximately 26.9 tons per truck load. This corresponds to approximately 1600 pounds of waste per cubic yard of bale.

It is noted that the truck 120 is shown in FIG. 9 merely for purposes of illustration, and is not intended to limit the scope of the invention thereto. It will be readily appreciated by those having ordinary skill in the art after becoming familiar with the teachings herein that other trucks may also be implemented with the waste processing and transportation system of the present invention.

Although several embodiments of this invention have been described above with a certain degree of particularity, those skilled in the art could make numerous alterations to the disclosed embodiments without departing from the spirit or scope of this invention. For example, the waste bales may be transported by any combination of transportation modes depending on the unique circumstances. Where waste is to be transported over long distances, local trucks may deliver the loose waste to a baling plant, and the wrapped bales may then be transported via railcar or barge instead of relying on truck transport. If the remote destination is not accessible via the railcar or barge, local truck transportation may then be used to deliver the bales to their final destination. In a system that handles approximately 8500 tons of loose waste per week (450,000 tons per year), for example, shipping the waste bales via railcar or barge may eliminate approximately 20,500 truck movements over the highway systems, which may drastically reduce traffic on the roadways, pollution caused by the trucks, and labor costs for individual truck drivers. Thus, individual waste-processing and transportation systems may be individually tailored to maximize the efficiency of transporting waste depending upon any number of factors.

Elements of each embodiment may be substituted into other embodiments without departing from the spirit of the invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A system for processing and transporting waste, the system comprising the following:
 a baler that processes loose waste into waste bales that are wrapped and sealed so as not to require any further processing or containerization in order to keep the baled loose waste controlled prior to reaching a waste disposition facility;
 a first transport vehicle selected from the group consisting of trucks, railcars, boats, and barges, wherein the first transport vehicle transports said waste bales to a waste transfer facility;
 a first material handler that moves said waste bales onto said first transport vehicle; and
 a second material handler at the waste transfer facility to move the waste bales from the first transport vehicle to a second transport vehicle selected from the group consisting of trucks, railcars, boats, and barges to transport the waste bales to the waste disposition facility.

2. The system of claim 1, wherein said baler further comprises means for producing hermetically-sealed bales.

3. The system of claim 1, wherein said baler further comprises means for producing bales that are substantially uniform in size and weight.

4. The system of claim 1, wherein each of said waste bales has a weight approximately in a range from 1.25 tons to 7 tons.

5. The system of claim 1, wherein said baler produces bales selected from the qroup consisting of substantially-cylindrical bales and bales having a generally rectangular cuboid shape.

6. The system of claim 5, wherein said baler further comprises means for producing bales that are substantially airtight, substantially watertight, and substantially uniform in size and weight.

7. The system of claim 1 further comprising the following:
 a receiving area where the loose waste is delivered;
 a loader that operates in the receiving area to load the loose waste into the baler; and
 a loading area where the first material handler loads the waste bales onto the first transport vehicle.

8. The system of claim 1 further comprising an intermodal container, wherein the waste bales are loaded into the intermodal container, and wherein the intermodal container is loaded onto the first transport vehicle and onto the second transport vehicle.

9. The system of claim 1, wherein each waste bale itself serves as an intermodal container without further containerization of the loose waste.

10. The system of claim 1, wherein the waste bales are substantially airtight and substantially watertight.

11. The system of claim 1, wherein each of the waste bales is hermetically sealed.

12. The system of claim 1, wherein the first transport vehicle is of a first type, wherein the second transport vehicle is of a second type, and wherein said first type of transport vehicle is different from the second type of transport vehicle.

13. The system of claim 1, wherein the baler further comprises a shredder that receives the loose waste and to convert the loose waste into a substantially uniformly-sized waste material.

14. The system of claim 1, wherein the baler comprises a baling chamber that compresses the loose waste.

15. The system of claim 14, wherein the baler chamber pre-wraps the loose waste.

16. The system of claim 1, wherein each bale is in the form of a solid cylinder comprising substantially circular longitudinal end surfaces and a substantially cylindrical outer surface extending between the circular longitudinal end surfaces, and wherein the baler includes a wrapping station that wraps both the cylindrical outer surface and the circular longitudinal end surfaces with a sheet material.

17. The system of claim 16, wherein said wrapping station further comprises a heli-wrapper that orbits a roll of said sheet material around said bale.

18. The system of claim 17, wherein said wrapping station further comprises a conveyor that rotates said bale about a bale longitudinal axis as said heli-wrapper orbits said roll of said sheet material around said bale.

* * * * *